Aug. 24, 1943.    M. EWALD    2,327,343
PROCESS OF REMOVING SEED-CONTAINING
SECTIONS FROM HALF FRUIT
Original Filed May 28, 1932    3 Sheets-Sheet 1

Inventor
Mark Ewald
By:- Cox & Moore attys

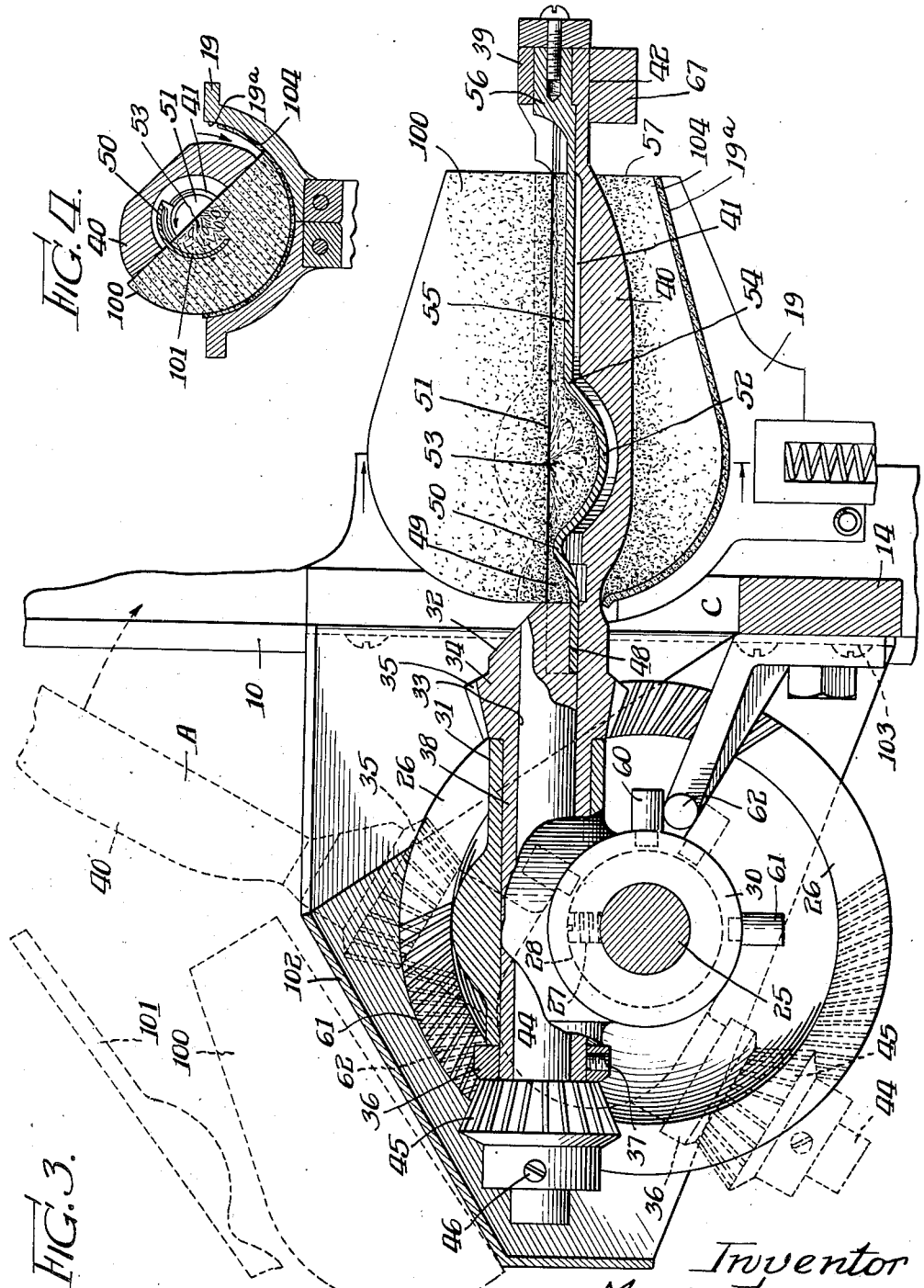

Aug. 24, 1943.  M. EWALD  2,327,343
PROCESS OF REMOVING SEED-CONTAINING
SECTIONS FROM HALF FRUIT
Original Filed May 28, 1932   3 Sheets-Sheet 3

Inventor
Mark Ewald
By:- Cox & Moore attys.

Patented Aug. 24, 1943

2,327,343

UNITED STATES PATENT OFFICE 2,327,343

PROCESS OF REMOVING SEED-CONTAINING SECTIONS FROM HALF FRUIT

Mark Ewald, Olympia, Wash., assignor to Special Equipment Company, Portland, Oreg., a corporation of Oregon Original application May 28, 1932, Serial No. 614,062. Divided and this application January 29, 1938, Serial No. 187,690

11 Claims. (Cl. 146—219)

This invention relates to a process for removing the seed-containing section of a half fruit, and more specifically to a process of coring half pears.

This application is a division of my prior filed application, Serial No. 614,062, filed May 28, 1932, entitled "Fruit cutting apparatus" which has matured into Patent No. 2,231,002 granted Feb. 11, 1941.

Among the objects of the present invention are to provide a process for removing the seed-containing section of a half pear by forming an arcuate cut, and preferably a truly circular cut, concentrically about a stationary axis corresponding to the stem axis at the cut face of the half pear, to remove the core proper and also the long, tough stem threads joining the stem to the core proper of a half pear, by forming a single, continuous arcuate cut beginning and ending at the cut face of the half pear, which cut is formed or generated about an axis corresponding substantially to the stem axis of the half pear; simultaneously to sever the core proper and the long, tough threads that join it to the stem of a half pear; simultaneously to remove the core proper, such threads and also the calyx or blossom of a half fruit, particularly a half pear; simultaneously to remove the core proper, such threads and also the blossom of a half pear by a single cut; to form by a single cut a continuous, semicylindrical channel of variant cross sectional size at the cut face of a half pear coextensive with and substantially at the stem axis of the half pear, the cross sectional diameter of the cut being greatest at the core proper, being relatively smaller and uniform from one end of the core proper to the stem end, the opposite end of the core proper progressively tapering in diameter to the minimum cross sectional area of the channel, and thence flaring outwardly to a diameter larger than that portion of the channel which is of uniform diameter, whereby to remove in a single continuous severing operation all of the undesirable portions of the half pear while leaving the maximum amount of edible flesh of the half pear; to provide a quicker process for coring a half pear by turning the pear about its stem axis in one direction while forming an arcuate line of severance about such axis but in the opposite direction whereby completely to core the half pear and/or sever the stem strings and/or the calyx during a forty-five degree angular movement of the pear and the coring means; to provide a process for coring and discharging a half pear from a fruit holding means, particularly a cup, by turning the coring cutter substantially about the stem axis of the half pear, and for turning the half pear about such same axis to invert the half pear relatively and to a position substantially wholly outside of the holding means whereby to facilitate the discharge of the cored pear from the vicinity of the holding means; to provide a process for coring a half fruit, particularly a half pear, by supporting the half pear for turning substantially about its own stem axis while producing relative turning movement about such axis between the half pear and cutting means likewise mounted for turning about such axis whereby not only to completely sever the core of the half fruit and/or to substantially invert the half fruit and discharge it from its holding means; to provide these and other objects of invention as will be apparent from a perusal of the following specification when taken in connection with the accompanying drawings, wherein:

Fig. 1 is a plan view of one form of mechanism for carrying out my improved process;

Fig. 2 is a perspective view of the driving means for the coring device, showing a portion thereof in cross section and taken on line 2—2 of Fig. 1;

Fig. 3 is a sectional view of one element of the device taken along the longitudinal axis thereof, as indicated by line 3—3 of Fig. 1;

Fig. 4 is a lateral section passing conjointly through one of the fruit cups of the machine and an associated coring element, illustrating the movement of the half fruit and coring mechanism during a phase of the process.

Figure 5:
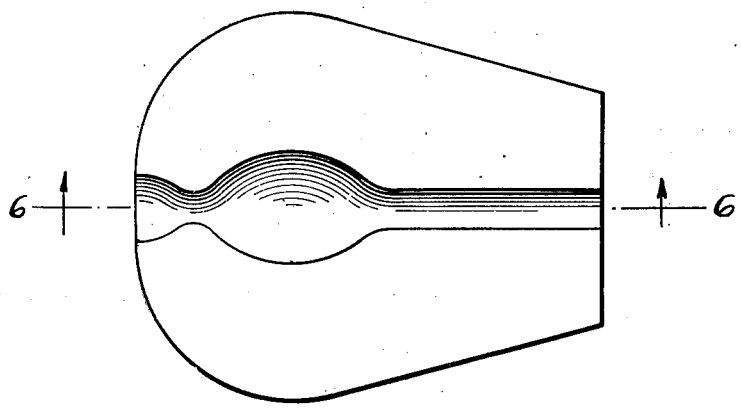
Figs. 5, 6 and 7 are views showing the half fruit as cored by my improved process.
Figure 6:
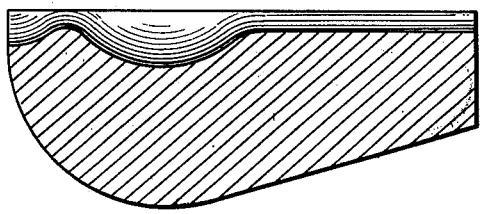
Figure 7:
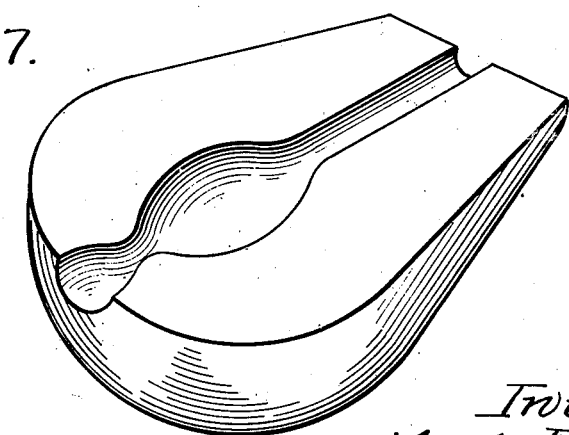

For the purpose of exemplifying my process, I have illustrated the same in connection with an apparatus which includes an intermittently operable turret provided with a plurality of means for holding half fruits. It is to be understood, however, that the process by its very nature is not so limited but may be practiced in any desired manner.

The invention is concerned primarily with a process for removing the seed-containing section of a half fruit, as distinguished from a whole fruit. Specifically, the invention is concerned with means for severing the core of half pears, wherein each half pear is formed by splitting or cutting a whole pear along a plane passing through the stem axis of the pear so that the half pear is provided with a flat cut face. By reference to the drawings, the particular type of apparatus I have selected for illustrating the process comprises four upright angle posts 10, 11, 12 and 13, which constitute a frame for the machine. Cross members 14 and 15 of the frame coact as supporting means for the present invention. The machine has a turret 16 comprising a central bearing block 17 having radiating quadrantly therefrom horizontal arms 18, the latter of which have fruit holding members, preferably in the form of fruit cups 19, at their extended ends. The turret 16 is disposed to rotate preferably in an anti-clockwise direction when viewed from above.

Progressively the turret acts intermitently to advance each pair of fruit holders 19 to the coring station. In the present illustrated embodiment, I have selected one of my prior types of automatic machines which provides a plurality of stations about the turret, being designated by the letters A, B, C, and D in the order given. It is understood, however, that the present invention relates only to the process carried out at the coring station. Prior to reaching station A, a fruit has been divided longitudinally into halves in the manner stated. At station A, a half of the fruit is introduced into each fruit holder 19 with its flat plane cut face exposed and preferably facing upwardly. A subsequent intermittent turning of the turret delivers the cups holding the halved fruit to station B where, if desired, a paring operation is performed, the skin or peel being separated from the half fruit proper. The peeling operation is described and claimed elsewhere in my applications and forms no part of the present invention. After the paring operation has been performed, the cups 19 and contents are advanced to position C, where the method of the present invention is carried out; in short, where the core and/or calyx or blossom is removed from the fruit and the fruit and core and/or blossom discharged from the receptacle by apparatus about to be described. The cycle of operations is completed after the fruit receptacles are momentarily positioned at station D, where the peel remaining in the cup is removed therefrom preparatory to the return of the cups to station A.

With the foregoing cycle of operations in mind, Figs. 1 and 3 should be read conjointly. Fig. 3 illustrates in detail one form of mechanism for coring the half fruit. Secured to the frame angle posts 10 and 11 by ordinary means 20 are standards 21 and 22 terminating in bearing blocks 23 and 24, respectively, which provide journals for a shaft 25. Inwardly of the ends of this shaft 25, gear wheels 26 are keyed or otherwise fixed thereto for rotation therewith. Movement of the gears 26 axially of the shaft 25 is prevented by set screws 27 engaging shaft 25 and threaded into apertures provided in flanges 28 to one side of the gears.

Friction bearing boxes 29 are rotatively positioned on the shaft 25 intermediate the gears 26 by means of bearings 30. A second bearing 31 in each block 29 is normal to and above the first mentioned bearing 30. Journaled in each bearing 31 is a specially shaped spindle 32 with a longitudinal bearing 33 within the journaled portion thereof.

A shoulder 34 circumscribing the member 32 has cut thereon teeth to provide a pinion 35 integral with the spindle. The spindle or stem 32 is contained within bearing 31 and against lateral movement through the agency of the shoulder 34 at the forward end and a collar 36 at the opposite end. A set screw 37 insures a fixed position for collar 36.

The forward end of stem or spindle 32 extends generally as a flat member 40 hereinafter referred to as means for engaging the flat face of the half fruit on opposite sides of the core, and which in addition in the present instance provides means for turning the half fruit relative to its holding means. This flat member 40 when in inverted position, as in Fig. 3, depends below the mutual axis of a shank 38 and a boss 39. This latter boss is at the extreme forward end of the stem 32. The fruit contacting face of the aforementioned dependent section 40 is flat and describes a surface of contact somewhat similar to the flat face exposed by a pear halved longitudinally along its stem axis.

Formed within the flat upper side of the element 40 is an opening. In the present instance this opening is formed as a semicircular cavity 41 formed substantially concentrically about the axis of the spindle 32 and coextensive with the length of the exposed flat face from one end of the cup section to the other end thereof. An enlarged section 43 of the cavity concentrically formed about the axis of turning the spindle 32 occurs at a point substantially central of the widest portion of the element 40.

In the floating bearing 33 is a shaft 44 carrying a pinion 45 fixed thereto by a key 46. A surface depression is formed at the foremost end of shaft 44 to receive the end of a curved coring blade 47 which is solidly incorporated therewith by any effective means. This blade 47 constitutes the means for severing the seed-containing section and/or blossom from the half fruit. As specifically illustrated in the present application, it comprises means for coring a half pear.

This coring blade is of semi-circular transverse cross section throughout its length except for its outer end, as hereinafter set forth, and its length is coextensive with the longitudinal stem axis of the half pear. It is shaped at various positions along its length to correspond with the general outline of the core of a half pear, except between the core proper and the calyx or blossom. Specifically, the blade from left to right, as viewed in Fig. 3, comprises a semicircular portion 48 by which the blade is firmly fastened to a turnable driving member. The blade to the right of this semicircular portion 48 flares inwardly in cross sectional outline, as at 49, to a narrowed or restricted portion 50 of minimum radius from the axis 51 of rotation of the blade. From the portion 50 the blade then bulges outwardly to a maximum radius from its axis of rotation, as designated by the numeral 52. This bulged portion is curved, as shown in Fig. 3, in a direction somewhat parallel to the longitudinal axis of the cutter whereby to produce a rounded or semicircular cavity of maximum diameter to correspond to the half core proper 53 of the half pear. From point 54 of the coring device the cutter, as shown at 55, is substantially uniform in shape and cross section to a bearing 56 formed at its outer end and preferably formed integrally therewith. This substantially straight, shell-like section 55 of reduced but uniform cross section forms a cojoining relatively narrow channel in the cut face of the pear centrally about the stem axis and is for the purpose of removing the relatively tough, elongated, substantially parallel threads which join the core proper to the stem of the pear. These threads are generally in the form of a relatively narrow tube in the whole pear and when the pear is cut in half they are in the form of a relatively narrow, semi-cylindrical tube so that the portion 55 of the coring cutter on rotation will remove these threads simultaneously and integrally with the removal of the core proper 53 which is of larger diameter. Since it is desirable also to remove the blossom or calyx of the half pear during the coring operation, and since the blossom or calyx sometimes lies off center of the pear, the portion 49 of the cutter is flared outwardly from the portion 50 whereby on rotation of the cutter about substantially the stem axis of the pear as hereinafter described this semicylindrical flared portion 49 will remove the calyx or blossom irrespective of whether the blossom is directly on center or is off center.

Inasmuch as no threads are present in the pear between the calyx or blossom and the core proper 53, the wall of the cutter curves inwardly as at 50 to a point of minimum radius from the stem axis 51, which permits the flared blossom or calyx cutter to be formed as an integral part of the core and thread cutter while at the same time permitting the removal of the very minimum flesh of the pear between the core proper and the calyx or blossom upon rotation of the coring cutter, and likewise permits, upon said rotation, the formation and discharge from the processed half pear of a one-piece core consisting of the core proper integrally joined to the calyx or blossom by a narrow neck of pulp or pear flesh at one end of the core proper and by a relatively narrow, relatively long, half cylindrical body of tough threads integrally joined to the core proper and extending therefrom to the very end of the stem end of the pear.

It will be borne in mind that in the process of this machine, prior to the half pear arriving at the coring station it will have been bobbed, as indicated at 57, at one of the prior stations so that the stem and a portion of the neck and connecting threads have been severed cleanly therefrom and at right angles to the stem axis of the half pear.

The outer end 56 of the coring cutter is preferably rounded for rotating in the bearing 42 of the member 40. This lug contains a tapped opening 58 and provides a journal member for the foremost end of the coring blade. A cap 59 is secured to the end of the journal by means of a screw and coacts with the pinion 45 as an abutment for the end thrust of the assembly. The longitudinal axis of the coring knife 47 throughout its length is sharpened so that on rotation of the coring blade substantially about the stem axis 51 of the pear, the blade will form a continuous semicylindrical cut about the stem axis of the half pear at the cut face of the half fruit, which semicylindrical cavity is coextensive with the longitudinal axis of the cut face of the half fruit for the purpose of removing the undesired core portions, stem and blossom of the half fruit as hereinbefore described.

Extending radially from the sleeves 30 are lugs 60. These lugs lie in a direction parallel to the operating axis of the paring instrumentality. Similar lugs 61 are positioned on bearing members 30 ninety degrees from and below the first mentioned lugs. These lugs 60 and 61 serve as stops alternately to about a stem 62 presented in the arcuate path of travel, said stem being supported by a bracket 63 bolted to the horizontal frame bar 14.

On opposed annular beveled faces 64 of the gears 26 are provided two independent arcs 65 and 66 of gear teeth. The sleeves 30 are contiguously disposed and are of a length measurably to position pinions 35 and 45 in mesh with gear trains 66 and 65 respectively.

Stationarily positioned in the center of the machine proper is a block 67 about a vertical shaft 68 which may rotate therein. To block 67 a bracket 69 is secured by studs 70. A cross-bar 71 at the end of bracket 69 provides a rest for spindles 32. Similarly disposed on block 67 and arranged to extend horizontally therefrom at an angle ninety degrees from the first mentioned bracket is a second bracket 72 bearing a cross arm 73. The frictional engagement of shaft 44 with bearing 33 is such that the pinion 45 and shoulder 34 do not rotate during certain operations. Therefore the fruit and core and coring instrumentality are carried upwardly and about shaft 25 approximately ninety degrees until stop 61 strikes stop 62, all as will be hereinafter more fully pointed out.

At the right end of 25 a pinion 74 engages a like pinion 75, the rotating axis of the latter being ninety degrees to the former. The pinion 75 is mounted on a shaft 76. The shaft 76 is journaled in bearings 77 provided by short arms 78 which are bolted to the legs 11 and 12. Gears 77' are keyed on the shaft 76 to rotate therewith. The beveled faces 79 on said gears 77' are opposed and are each rifled with an arc 80 of gear teeth. Intermediate the gears 77' are friction gear boxes 81. These boxes 81 are rotatably disposed upon the shaft 76 by virtue of bearings 82. The bearings 82 are coextensive with the space between the beveled gears 77'. Immediately above bearings 82 and normal thereto are bearings 83 carrying a spindle 84 on which is keyed a pinion 85. Pinion 85 engages gear teeth 80 and coacts with a collar 86 to retain the journaled position of the stub shaft or spindle 84.

A scavenging means is provided on the spindle 84, specifically in the form of a flat, leaf-like member 87 riveted or otherwise fastened thereto and placed exactly over the recesses 19a in the fruit holders or cups 19. The peripheral edge of these scavenging members 87 is such as to sweep out the inner walls of the cavities 19a when rotated about the axis of the shafts 84. No claim herein is made to the specific means per se for operating the scavenging means 87, since that subject matter is disclosed and claimed in an application filed by me on January 21, 1935, Serial No. 2,620, which has matured into Patent No. 2,210,910 granted Aug. 13, 1940, the same being an improvement over the scavenging device disclosed and claimed in my prior Patent No. 1,989,090, issued January 29, 1935.

Lugs 88 and 89 are placed at ninety degree intervals on bearings 82 to collide with a cross piece 90 on a boss 91 secured to the frame member 15. Limited rotative movement of the sleeves 82 about shaft 76 is thereby attained. The inner and extended ends of the stems 84 strike the abutment 75 simultaneous to the contact of the lugs 88 with stop 90, thus to carry the weight of the spindles and eliminate the shock otherwise absorbed by said lugs.

A small gear 93 is keyed to shaft 76 and contiguous to the bearing near the forward side of the machine. A set-off sleeve 94 coacting with a set screw 95 serves to prevent axial displacement of the pinion 93. Below the assembly just described and attached to the leg 11 is a guide standard 96 functioning to keep the teeth of a rack 97 in mesh with those of the pinion 93, see Fig. 2.

Feathered to the main drive shaft 98 of the machine is a cam 99, shown in cross section to reveal an eccentric groove 100 in the side thereof. The bottom end of rack 97 is articulated ninety degrees to be welded or otherwise suitably attached to a cam follower plate 101. A lug 102 at the upper end of the plate rides in a boss 103. The back of the plate 101 is in abutment with a washer 104 which is disposed upon the shaft 98 adjacent a bushing block 105. Thus the lug 102 is confined in the eccentric race 103.

Operation

The fruit cups 19 as they arrive at station C contain halved fruit, properly bobbed, that is, with the stems cut therefrom, the fruit being arranged with its flat surface exposed and preferably lying upwardly, and with the peeling pared therefrom but lying thereunder in the natural position it occupied prior to severance. When the receptacles 19 are first positioned at C, the coring plate 40 is in some such position as indicated in dotted outline at A in Fig. 3. The rack 97 is being drawn downward by the cam follower 101 through power received from the main drive shaft 98. Further downward motion of the rack rotates the shaft 76 and hence shaft 25 because of the coaction of the pinions 74 and 75. By downward movement of the rack 97, the shaft 25 is rotated in a clockwise direction as viewed in Fig. 3.

As the shaft 25 rotates in such clockwise direction, bevel gears 26 turn likewise as do sleeves 30. The flat face of the half fruit contacting member 40 is brought into contact with the cut exposed face of the half pear, and simultaneously lug 60 engages stop 62, and the end of spindle 32 is engaged by the cross arm 71. However, the shaft 25 and the gears 26 continue to rotate in the same direction. Reference to Fig. 4 discloses that further rotation of the shaft 25 will turn the spindle 32 and block 40 in a clockwise manner as viewed from the inner end of the machine, while the pinion 45, the stem 44 and hence the coring blade 47 are revolved counter-clockwise.

Turning of the spindle 32 and flat member 40 while they are in horizontal position turns the halved fruit 105 within the pocket 19a substantially about the stem axis 51 of the half pear, as illustrated in Fig. 4. It is noted that the fruit 105 is securely held in the cavity 19a by the plate 40 while the blade 47 cuts into said fruit. While the coring blade 47 rotates one hundred eighty degrees about substantially the axis 51, the spindle 32 also rotates one hundred eighty degrees about this same axis 51. When the coring blade 47 lies within the cavity provided in the member 40, rotation of this member one hundred eighty degrees will invert it; likewise a rotation of the blade one hundred eighty degrees in the opposite direction will again place the blade within the cavity and the relative position will be the same. Therefore in the present case when the flat member 40 is placed flatly against the cut face of the fruit 105 in the receptacle 19 and rotated one hundred eighty degrees, the half fruit is displaced from the receptacle and is caused to lie upon the upper surface of the now inverted flat member 40. Meanwhile, the coring blade 47 has been rotated one hundred eighty degrees to sever the core 106 from the fruit 105, including the blossom 107, and to again lie within the central cavity of the member 40 and to leave the core lying loosely in the coring blade and member 40. At the close of the coring operation, the fruit and separated core are upon the upper face of the member 40 and the peeling is in the cup previously occupied by the peeling, the fruit and the integral core.

When the beveled gear 26 has turned sufficiently to operate the coring knife and spindle each one hundred eighty degrees and in the manner just described concurrently to core the half fruit and discharge such half fruit from the cup, the rack reverses its movement to rotate the gear 26 in an anti-clockwise direction. The frictional engagement of the shaft 44 with its friction bearing 33 is such that the pinion 45 and shoulder 34 do not rotate. Therefore the fruit and core and coring instrumentality are carried upwardly and about the shaft 25 as an axis approximately ninety degrees until the stud 61 strikes the stop 62. The sudden stoppage of the spindle incident thereto dislodges the fruit 105 and the core 106 therefrom as shown in dotted outline in Fig. 3.

The fruit falls clear of the device or upon an angular apron 108 provided for that purpose and fastened to the frame member 14 by screws 109. The fruit when falling in the apron 108 slides from the platform to a water or belt conveyor, not shown.

As soon as the lug 61 strikes the stop 62, the sleeve 31 is held stationary while the gear 26 rotates counter-clockwise to move the pinions 45 and 35 one hundred eighty degrees each to thus turn the flat face of the member 40 into position to engage a fruit which has been delivered, by this time, to the station C in another cup or cups while the dumping process just described is being carried out. The newly delivered half fruit is then treated in a similar way to accomplish the coring and dumping cycle as above described.

Peel 110 of the half fruit was left in the cup cavity 19a when the fruit was extracted incident to the coring operation. The intermittent rotary motion of the turret 16 on which the fruit cups are mounted has caused the fruit cups containing the peel to be conducted away from the coring station C, and the device is arranged to bring the cups containing such loose peel to the station D. As the cups 19 arrive at station D, the spindles 84 are in elevated position. These spindles are then rotated downwardly by the coaction of rack 97, which has just started its downward half cycle, and shaft 76, which is thereby rotated in a counter-clockwise direction as viewed from the front in Fig. 1. Continued rotation of the shaft 76 brings the spindles 84 to abut upon the cross arm 75 and simultaneously lugs 88 abut against the stop 90. The further rotation of the compound blocks 81 and the shaft 68 is thus prevented. However, the beveled gears 72 which are keyed to the shaft 76 continue to turn with the teeth 80 thereon engaging pinions 85 rotating spindles 84. Hence the scavenging members 87 are rotated in the cup cavity 19a to wipe the peels from these cups 19. The rack 97 ceases its downward movement when the scavenging members 87 have turned one hundred eighty degrees, during which the scavenging members have wiped the peel from the cup 19. Such peel is temporarily disposed upon the then top face of the scavenging blades. At that time the rack reverses its movement to rotate the shaft 76 and the friction blocks 81 clockwise, thereby lifting the spindles 84 from the support 75 without rotating the scavenging blades 87, with the result that the peel is transported upwardly by said scavenging blades.

A ninety degree rotation of the sleeves 82 brings the lugs 89 against the bar 90 to prevent further turning of the friction blocks 81. The sudden stoppage of the scavenging blades 87 dislodges the pear peelings therefrom, the peelings falling upon a conveyor or discharge chute, not shown, or upon the platform 108 at an angle to the horizontal and covering the gears 77'. Such platform 108 extends between the sides 111, as shown in Fig. 1, and whatever peeling falls thereon will eventually slide onto the discharge conveyor or fall into the discharge chute. Side members 111 are secured to the transverse frame member 15 by means of screws 112.

After the pins 89 strike the bar 90, the rack 97 continues its upward movement to cause the gears 77' to rotate the pinions 85 and the scavenging blades 87 one hundred eighty degrees before the next downward stroke, to carry the spindles 84 in registry with the succeeding pair of cups, has started. Since shafts 25 and 76 are operated from the identical source of power, the stems 32 and 76a may be made to rise and fall in unison or in timed relation. One may be made to operate at a greater speed than the other by changing the gear ratios. The cam driving the cam follower 101 is fixed at a given rotative position on the main operating shaft 98 so that the coring devices and peel scavenging instrumentalities operate on material within the cups 19 while the turret is at a standstill, and discharge the fruit and peels respectively therefrom intermediate successive progressive quadrantal shifts of the turret spider 16.

The present device for removing the core from a fruit has advantages over preceding coring equipment in that it is exceptionally rugged of construction and exceedingly simple of structure for a device performing a task so arduous. It has the added advantage of effectively coring the fruit and removing the threads and also the blossom.

It will thus be seen that upon rotation of the coring cutter or blade, I am enabled to core a half fruit by the very simple process of forming a single continuous line of cut starting at the cut face of the half fruit on one side of the stem axis of the half fruit, which line of cut is coextensive and substantially concentric with the longitudinal stem axis at the cut face of the half fruit, and that such line of cut is formed arcuately substantially about the stem axis as a center of turning; that said line of cut is simultaneously formed coextensively with the stem axis of the fruit and at varying radii along the stem axis of the fruit from said stem axis; that due to the variation in such radii along the length of said stem axis, by the formation of this arcuate line of cut which terminates at the cut face of the half fruit on the opposite side of the stem axis, I am enabled simultaneously to sever the core proper of the half pear, the adjoining threads extending from the core proper to the stem end of the fruit and also the blossom or calyx of the fruit, irrespective of whether or not the calyx is off center, and this is accomplished with the very minimum removal of edible flesh from the half fruit, and in a manner to form a symmetrical, semi-cylindrical groove of varying shape in the cut face of the half fruit, which gives a pleasing and trim appearance in the ultimately processed half fruit.

In addition, by causing the half pear to rotate or turn in a direction parallel and simultaneously with the formation of the coring cut, the coring operation is effected in a much shorter interval of time. Furthermore, by this process the cored half fruit is discharged from its holding means, to wit, the cup, and in addition the cored portion together with the blossom end is discharged likewise from the cup.

The present application is restricted to process and product claims, and is related to my pending application Serial No. 746,952, filed October 5, 1934, entitled "Coring device," which has matured into Patent No. 2,282,326 granted May 12, 1942, the claims of which are restricted to the coring blade per se as an article of manufacture. The present application is likewise related to my Patent No. 2,072,103, issued March 2, 1937, the claims of which patent are limited to the process of forming the coring blade.

Having thus described my invention, what I claim as new and desire to secure by Letters Patent of the United States is:

1. A method of coring half pear having a calyx, a core proper section, and a stem thread section extending from the core proper to the stem end, which comprises cutting a section which is semicylindrical in cross section in a direction transverse to the stem axis and which is substantially elliptical longitudinally of the stem axis to remove the core proper from the half pear, while cutting a substantially semicylindrical section of relatively smaller radius about the stem thread section of the half pear and extending from the core proper section to the stem end of the half pear, while simultaneously cutting a substantially conical section about the calyx to remove the same from the half pear, and while cutting a semicylindrical restricted channel in the half pear between the calyx and core proper and substantially concentric about the stem axis of the half pear whereby to form a single, semicylindrical, continuous channel of varying width and depth along its length, which channel approximates in shape the natural shape of the calyx, the core proper and the stem thread section.

2. A method of coring half pear having a seed-containing section, a stem thread section and a calyx section, which comprises cutting into the flat surface of the half pear along a line having a straight portion spaced a minimum uniform distance from the stem axis of the half pear for a distance coextensive with the stem thread section, and having an outwardly curved portion coextensive with the core proper section, and having a second outwardly curved portion of smaller radius coextensive with the calyx section, and having a further portion connecting said outwardly curved portions and proximate to but not lying in the core axis, and severing the body of the half pear along a surface generated by the rotation of said line substantially concentrically about the stem axis as a center, to form a continuous channel of semicircular cross section transverse to the stem axis and extending from end to end of the half pear.

3. The herein described process of treating half fruit having its stem axis lying in the plane of the cut face thereof which comprises supporting the half fruit about its curved surfaces, leaving the cut face exposed, while rotating a cutting edge in one direction substantially concentrically about and coextensive with the stem axis of the half fruit, and simultaneously rotating the half fruit about said stem axis but in an opposite direction.

4. The herein described process of treating half fruit having its stem axis lying in the the plane of the cut face thereof which comprises supporting a half fruit about its curved surfaces, leaving the cut face exposed, revolving a cutter substantially concentrically about and coextensive with the stem axis of the half fruit to form a semi-cylindrical coring cut about the stem axis of the half fruit, and revolving the half fruit about said stem axis substantially to invert the half fruit while so supported.

5. The herein described process of treating a half pear having its stem axis lying in the plane of its cut face which comprises rotatably supporting the half pear about its stem axis, forming a semi-cylindrical line of severance substantially concentrically about substantially the stem axis of the half pear, the line of severance longitudinally of the stem axis conforming in general to the shape of the stem thread section and core proper section respectively, and turning the half pear about its stem axis substantially to invert the half pear.

6. The herein described method of treating half fruit having its stem axis lying in the plane of its cut face which comprises rotatably supporting the half fruit about its stem axis, forming a line of cut substantially concentrically about the stem axis as a longitudinal axis, the line of cut being formed coextensive with the stem axis of the half fruit and beginning and ending at the cut face of the half fruit, and turning the half fruit substantially about its stem axis whereby substantially to invert it.

7. The herein described method of treating half fruit having its stem axis lying in the plane of its cut face which comprises rotatably supporting the half fruit about its stem axis, forming a line of cut substantially concentrically about the stem axis as a longitudinal axis, the line of cut being formed coextensive with the stem axis of the half fruit and beginning and ending at the cut face of the half fruit, while turning the half fruit substantially about its stem axis whereby substantially to invert it.

8. The herein described method of coring a half pear having its stem axis lying in the plane of its cut face which comprises applying a cutter having a cutting surface coextensive with the stem axis of the half pear to one side of the stem axis at the cut face of the half pear, and rotating the cutter and the half pear simultaneously and substantially concentrically about the stem axis of the half pear whereby to core the half pear.

9. The herein described method of treating a half pear having its stem axis lying in the plane of its cut face which comprises supporting a half pear about its curved surfaces to permit the pear to be rotated substantially concentrically about its stem axis, cutting into the cut face of the pear laterally of the stem axis of the half pear, producing relative rotation between the half pear and the cutting means about the stem axis as an axis whereby to core the half pear and whereby to shift the half pear substantially to inverted position, and bodily projecting the inverted half pear laterally from its substantially inverted position.

10. The herein described method of treating a half fruit having its stem axis lying in the plane of its cut face which comprises supporting the half fruit about its curved surfaces with its cut face exposed and in a manner so as to permit the half fruit to be rotated substantially about its stem axis passing through the plane of the cut face of the half fruit, removing the central seed-containing section of the half fruit, turning the half fruit substantially concentrically about said axis substantially to invert the half fruit, and thereafter projecting the half fruit laterally from said substantially inverted position.

11. The herein described method of treating a half fruit having its stem axis lying in the plane of its cut face which comprises supporting a half fruit about its curved surfaces with its cut face uppermost, removing the central seed containing section of the half fruit, turning the half fruit substantially concentrically about a diametral axis lying substantially in the plane of the cut face of the half fruit substantially to invert the half fruit, and projecting the half fruit and its central seed-containing section laterally.

MARK EWALD.